US012583460B2

(12) United States Patent
Yamauchi et al.

(10) Patent No.: US 12,583,460 B2
(45) Date of Patent: Mar. 24, 2026

(54) DRIVING SUPPORT DEVICE, METHOD, AND COMPUTER PROGRAM FOR SUPPORTING DRIVING

(71) Applicants: TOYOTA JIDOSHA KABUSHIKI KAISHA, Toyota (JP); DENSO CORPORATION, Kariya-city (JP)

(72) Inventors: Koichiro Yamauchi, Tokyo-to (JP); Takuya Sakata, Tokyo-to (JP)

(73) Assignees: TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 118 days.

(21) Appl. No.: 18/443,466

(22) Filed: Feb. 16, 2024

(65) Prior Publication Data

US 2024/0326826 A1 Oct. 3, 2024

(30) Foreign Application Priority Data

Mar. 29, 2023 (JP) ................................. 2023-053534

(51) Int. Cl.
*B60W 40/08* (2012.01)
*B60W 50/14* (2020.01)
*B60W 60/00* (2020.01)

(52) U.S. Cl.
CPC ............ *B60W 40/08* (2013.01); *B60W 50/14* (2013.01); *B60W 60/0051* (2020.02); *B60W 2040/0827* (2013.01); *B60W 2420/403* (2013.01)

(58) Field of Classification Search
CPC .. B60W 40/08; B60W 60/0051; B60W 50/14;

B60W 2040/0827; B60W 2420/403;
G01S 13/88; G01S 13/931; B60Q 9/00;
G08G 1/00; G06V 20/597
USPC .......................................................... 701/23
See application file for complete search history.

(56) References Cited

U.S. PATENT DOCUMENTS

| | | | | |
|---|---|---|---|---|
| 8,698,639 | B2 * | 4/2014 | Fung ...................... | B60W 10/30 340/576 |
| 10,277,837 | B2 * | 4/2019 | Madau ................... | H04N 23/20 |
| 2002/0101354 | A1 * | 8/2002 | Banas .................... | G08B 21/06 340/576 |
| 2017/0240109 | A1 * | 8/2017 | Kimura .................. | G08G 1/167 |
| 2018/0126901 | A1 * | 5/2018 | Levkova ............... | B60W 40/09 |
| 2021/0052206 | A1 * | 2/2021 | Kale ...................... | G06N 3/088 |
| 2022/0212685 | A1 * | 7/2022 | Oba .................. | B60W 50/0098 |
| 2024/0378904 | A1 * | 11/2024 | Edwards ................. | G06T 7/246 |

FOREIGN PATENT DOCUMENTS

| | | | | |
|---|---|---|---|---|
| EP | 4582322 A1 * | 7/2025 | .......... | G06V 20/597 |
| JP | 2011186622 A | 9/2011 | | |
| JP | 2013028277 A | 2/2013 | | |

* cited by examiner

*Primary Examiner* — Tuan C To
(74) *Attorney, Agent, or Firm* — Dickinson Wright, PLLC

(57) ABSTRACT

A driving support device includes a processor configured to detect a sign of sleepiness of a driver of a vehicle, based on a driver image representing the driver's head generated by a driver monitoring camera configured to take a picture of the driver's head, determine a response request to the driver, depending on environment around the vehicle or a travel condition of the vehicle, when a sign of the driver's sleepiness is detected, and notify the driver of the response request via a user interface provided in the vehicle.

6 Claims, 5 Drawing Sheets

FIG. 3

DRIVING SUPPORT DEVICE, METHOD, AND COMPUTER PROGRAM FOR SUPPORTING DRIVING

FIELD

The present invention relates to a driving support device, a method, and a computer program for supporting a driver in driving a vehicle.

BACKGROUND

A technique for supporting a driver of a vehicle in remaining awake has been researched (see Japanese Unexamined Patent Publication JP2011-186622A).

A waking support device disclosed in JP2011-186622A generates motive information for motivating a driver to perform information input operation rhythmically via a user interface provided on the steering wheel of a vehicle, based on information inputted via the user interface, and gives the generated motive information to the driver. The user interface enables information input operation with at least one of eight fingers that are the first to fourth fingers of both hands, while the driver is gripping the steering wheel for steering operation. In addition, the waking support device estimates the driver's sleepiness level, and, when the estimated sleepiness level is not lower than a reference, presents a rhythm to the driver to assist in performing information input operation rhythmically.

SUMMARY

In the above-described technique, repetition of processing of support for remaining awake may result in a driver being get used to requested information input operation, reducing the effect of encouraging the driver in remaining awake.

It is an object of the present invention to provide a driving support device that can support a driver in remaining awake appropriately.

According to an embodiment, a driving support device is provided. The driving support device includes a processor configured to: detect a sign of sleepiness of a driver of a vehicle, based on a driver image representing the driver's head generated by a driver monitoring camera configured to take a picture of the driver's head, determine a response request to the driver, depending on environment around the vehicle or a travel condition of the vehicle, when a sign of the driver's sleepiness is detected, and notify the driver of the response request via a user interface provided in the vehicle.

The processor of the driving support device is preferably further configured to determine whether the driver has made a response requested in the response request after notification of the response request, and control the vehicle so as to stop the vehicle when the driver has not made the response even after a predetermined period from notification of the response request.

When a sign of the driver's sleepiness is detected, the processor of the driving support device preferably detects a predetermined feature in an area around the vehicle as one representing environment around the vehicle and determines a request for a response related to information represented on the detected predetermined feature as the response request.

Alternatively, when a sign of the driver's sleepiness is detected, the processor preferably detects an action of the vehicle as the travel condition and determines a request for a response related to the detected action of the vehicle as the response request.

Alternatively, the processor of the driving support device preferably determines the response request, depending on the level of autonomous driving control applied to the vehicle.

In addition, the processor of the driving support device preferably determines the level of the driver's sleepiness. In this case, the processor preferably determines the response request so that a more complicated response is requested as the level of the driver's sleepiness is higher.

According to another embodiment, a method for supporting driving is provided. The method includes detecting a sign of sleepiness of a driver of a vehicle, based on a driver image representing the driver's head generated by a driver monitoring camera configured to take a picture of the driver's head; determining a response request to the driver, depending on environment around the vehicle or a travel condition of the vehicle, when a sign of the driver's sleepiness is detected; and notifying the driver of the response request via a user interface provided in the vehicle.

According to still another embodiment, a non-transitory recording medium that stores a computer program for supporting driving is provided. The computer program includes instructions causing a processor mounted on a vehicle to execute a process including detecting a sign of sleepiness of a driver of the vehicle, based on a driver image representing the driver's head generated by a driver monitoring camera configured to take a picture of the driver's head; determining a response request to the driver, depending on environment around the vehicle or a travel condition of the vehicle, when a sign of the driver's sleepiness is detected; and notifying the driver of the response request via a user interface provided in the vehicle.

The driving support device according to the present disclosure has an advantageous effect of being able to support a driver in remaining awake appropriately.

BRIEF DESCRIPTION OF DRAWINGS

FIG. 3 is a functional block diagram of a processor of the electronic control unit, related to a driving support process.

DESCRIPTION OF EMBODIMENTS

A driving support device, a method for supporting driving executed by the driving support device, and a computer program for supporting driving will now be described with reference to the attached drawings. When a sign of a driver's sleepiness is detected, the driving support device determines a response request to the driver, depending on environment around a vehicle or a travel condition of the vehicle, and notifies the driver of the determined response request via an interface provided in the vehicle. The driving support device causes the driver to make a response depending on the notified response request thereby encouraging the driver to remain awake. In this way, the driving support device supports the driver in driving the vehicle.

Figure 1:
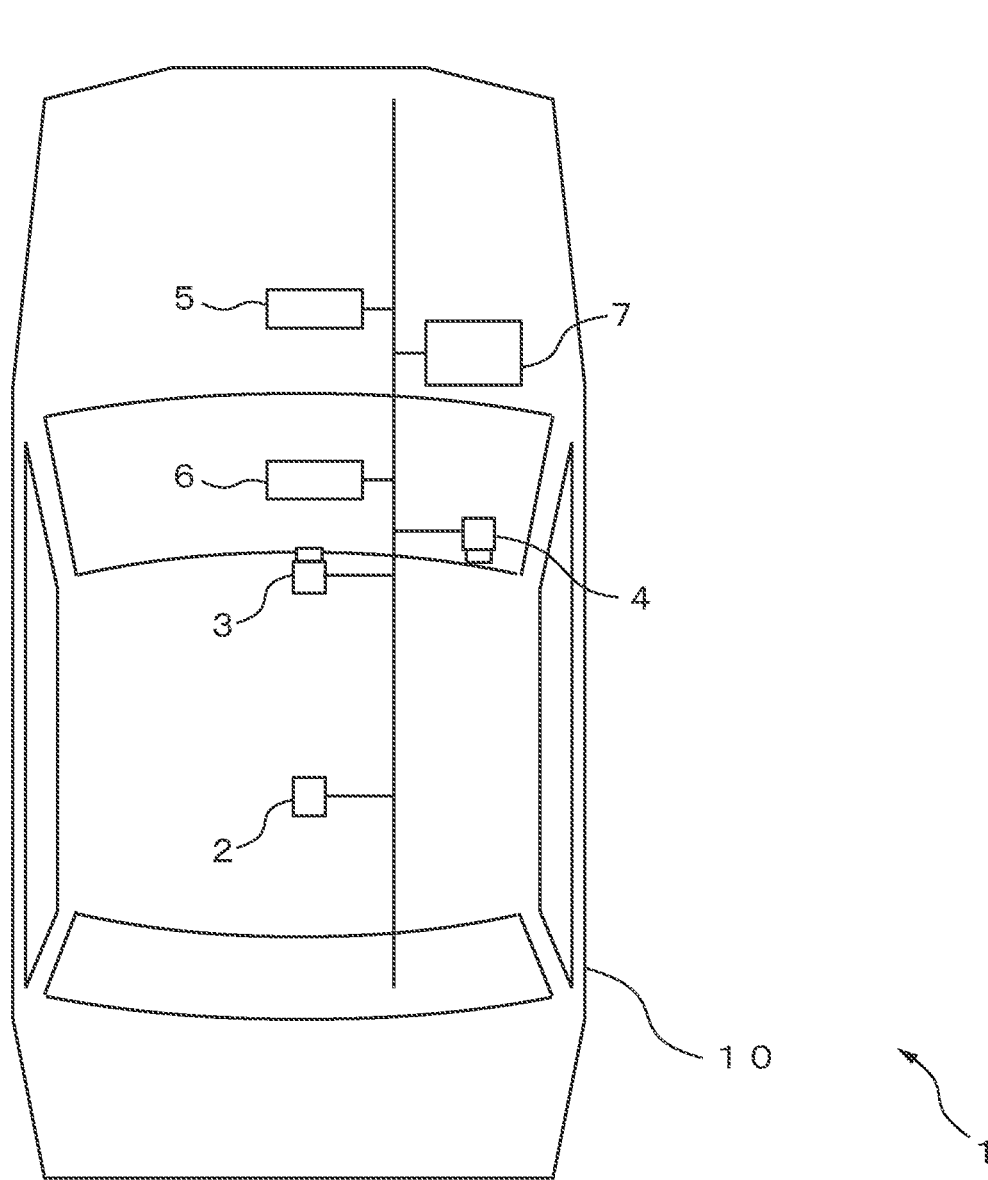
FIG. 1 schematically illustrates the configuration of a vehicle control system equipped with a driving support device.
Figure 2:
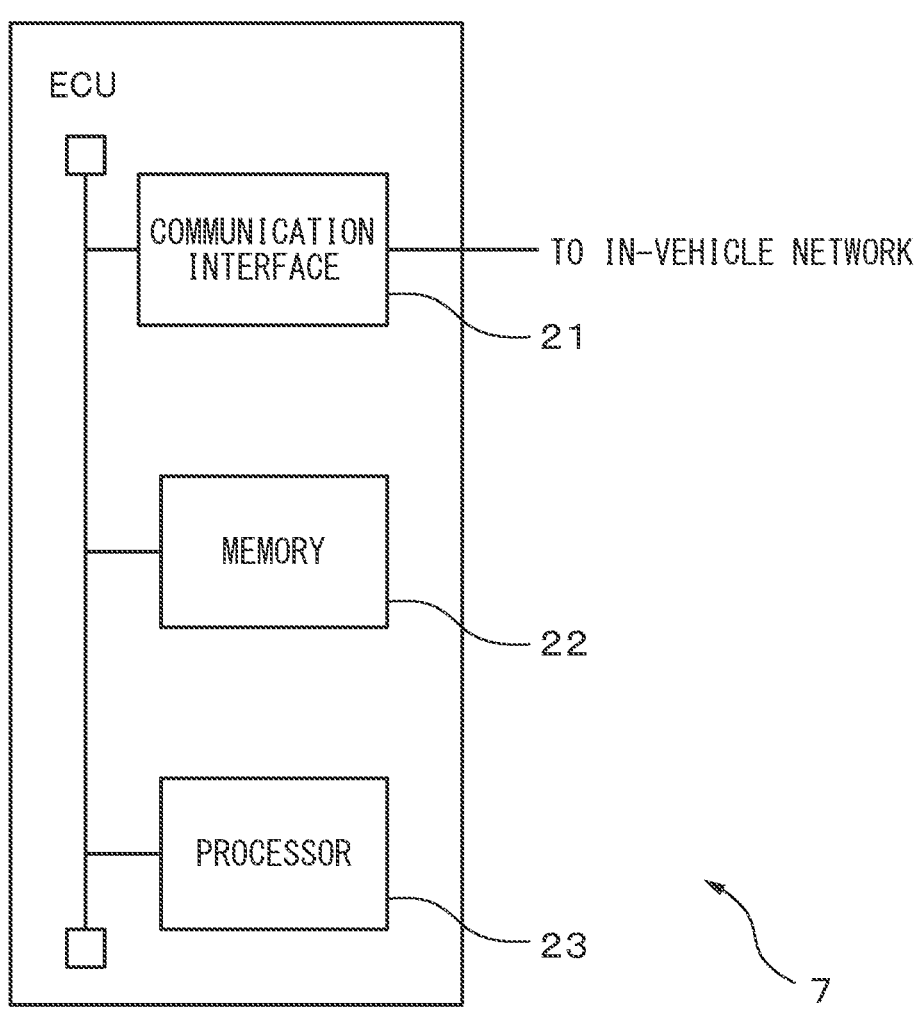
FIG. 2 illustrates the hardware configuration of an electronic control unit, which is an embodiment of the driving support device.

FIG. 1 schematically illustrates the configuration of a vehicle control system equipped with the driving support device. FIG. 2 illustrates the hardware configuration of an electronic control unit, which is an embodiment of the driving support device. In the present embodiment, the vehicle control system 1, which is mounted on a vehicle 10 and controls the vehicle 10, includes a GPS receiver 2, a camera 3, a driver monitoring camera 4, a storage device 5, a user interface 6, and an electronic control unit (ECU) 7, which is an example of the driving support device. The GPS receiver 2, the camera 3, the driver monitoring camera 4, the storage device 5, and the user interface 6 are communicably connected to the ECU 7 via an in-vehicle network conforming to a standard such as a controller area network. The vehicle control system 1 may further include a range sensor (not illustrated) that measures the distance from the vehicle 10 to an object in an area around the vehicle 10, such as LiDAR or radar. The vehicle control system 1 may further include a wireless communication terminal (not illustrated) for wireless communication with another device, and further include a navigation device (not illustrated) for searching for a planned travel route to a destination.

The GPS receiver 2 receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 7 via the in-vehicle network at predetermined intervals. The vehicle control system 1 may include a receiver conforming to another satellite positioning system, instead of the GPS receiver 2.

The camera 3, which is an example of a vehicle exterior sensor, includes a two-dimensional detector constructed from an array of optoelectronic transducers, such as CCD or C-MOS, having sensitivity to visible light and a focusing optical system that forms an image of a target region on the two-dimensional detector. The camera 3 is mounted, for example, in the interior of the vehicle 10 so as to be oriented, for example, to the front of the vehicle 10. The camera 3 takes a picture of a region in front of the vehicle 10 every predetermined capturing period (e.g., 1/30 to 1/10 seconds), and generates images representing this region. Each image obtained by the camera 3 is an example of an exterior sensor signal representing the surroundings of the vehicle. The images obtained by the camera 3 may be color or grayscale images. The vehicle 10 may include multiple cameras taking pictures in different orientations or having different focal lengths. For example, the vehicle 10 may include a camera oriented to the rear of the vehicle 10, together with the camera oriented to the front of the vehicle 10.

Every time an image is generated, the camera 3 outputs the generated image to the ECU 7 via the in-vehicle network.

The driver monitoring camera 4, which is an example of a vehicle interior sensor, includes a two-dimensional detector constructed from an array of optoelectronic transducers, such as CCD or C-MOS, having sensitivity to visible or infrared light and a focusing optical system that forms an image of a target region on the two-dimensional detector. The driver monitoring camera 4 may further include a light source, such as an infrared LED, for illuminating the driver. The driver monitoring camera 4 is mounted, for example, on or near an instrument panel and oriented to the driver so that the head of the driver sitting on the driver's seat of the vehicle 10 may be included in the target region, i.e., so that pictures of the driver's head can be taken. The driver monitoring camera 4 takes a picture of the driver's head every predetermined capturing period (e.g., 1/30 to 1/10 seconds), and generates images representing the driver's head (hereafter referred to as "head images" for convenience of description to distinguish them from images obtained by the camera 3). Each head image obtained by the driver monitoring camera 4 is an example of an interior sensor signal. The head images may be color or grayscale images. Every time a head image is generated, the driver monitoring camera 4 outputs the generated head image to the ECU 7 via the in-vehicle network.

The storage device 5, which is an example of a storage unit, includes, for example, a hard disk drive or a nonvolatile semiconductor memory. The storage device 5 stores a high-precision map, which is used, for example, in autonomous driving control of the vehicle. To this end, the high-precision map includes information indicating road markings, such as lane lines or stop lines, and traffic signs, such as speed limit signs, of individual roads as well as information representing the individual roads. The high-precision map is an example of map information.

The storage device 5 may further include a processor for executing, for example, a process to update the high-precision map and a process related to a request from the ECU 7 to read out the high-precision map. For example, every time the vehicle 10 moves a predetermined distance, the storage device 5 may transmit a request to obtain a high-precision map, together with the current position of the vehicle 10, to a map server via a wireless communication terminal (not illustrated). The storage device 5 may receive a high-precision map of a predetermined region around the current position of the vehicle 10 from the map server via the wireless communication terminal. When a request from the ECU 7 to read out the high-precision map is received, the storage device 5 cuts out that portion of the high-precision map stored therein which includes the current position of the vehicle 10 and which represents a region smaller than the predetermined region, and outputs the cutout portion to the ECU 7 via the in-vehicle network.

The user interface 6 includes a notification device for giving notification to the driver, e.g., a display such as a liquid crystal display, or a touch screen display. The user interface 6 is installed in the interior of the vehicle 10, e.g., near the instrument panel, so as to face the driver. The user interface 6 displays information representing predetermined notification received from the ECU 7 via the in-vehicle network, such as a response request, in the form of an icon or text, thereby giving the predetermined notification to the driver. As the notification device, the user interface 6 may include a speaker installed in the vehicle interior. In this case, the user interface 6 outputs information representing predetermined notification received from the ECU 7 via the in-vehicle network, in the form of a voice signal, thereby giving the predetermined notification to the driver.

The user interface 6 further includes a detection device for detecting the driver's response action. As such a detection device, the user interface 6 includes, for example, multiple touch sensors provided in the steering wheel. For example, the touch sensors are provided on the top, bottom, left, and right sides of the steering wheel for the case where the vehicle 10 is going straight. Every time the driver touches the steering wheel, one of the touch sensors detects the driver's touch on the steering wheel, generates a detection signal indicating that the driver has touched the steering wheel, and outputs the detection signal to the ECU 7.

Alternatively, the user interface 6 may include a microphone installed in the vehicle interior. In this case, the microphone collects the driver's voice, generates a voice signal representing this voice, and outputs the generated voice signal to the ECU 7.

The ECU 7 supports the driver in driving the vehicle 10. In the present embodiment, the ECU 7 detects a sign of the driver's sleepiness, based on a head image. When a sign of the driver's sleepiness is detected, the ECU 7 determines a response request to the driver, depending on environment around the vehicle 10 or a travel condition of the vehicle 10. The ECU 7 gives notification of the determined response request via the user interface 6 to cause the driver to make a response depending on the notified response request thereby encouraging the driver to remain awake. The ECU 7 executes the driving support process according to the present embodiment during execution of driving control at a level of autonomous driving in which the driver is or may be involved in driving the vehicle 10 (e.g., level 3 defined by the Society of Automotive Engineers (SAE) or a lower level) or during manual driving performed by the driver.

As illustrated in FIG. 2, the ECU 7 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 7 to the in-vehicle network. Every time positioning information is received from the GPS receiver 2, the communication interface 21 passes the positioning information to the processor 23. Every time an image is received from the camera 3, the communication interface 21 passes the received image to the processor 23. Similarly, every time a head image is received from the driver monitoring camera 4, the communication interface 21 passes the received head image to the processor 23. In addition, the communication interface 21 passes the high-precision map read from the storage device 5 to the processor 23. Further, the communication interface 21 outputs notification information representing a response request received from the processor 23, to the user interface 6 via the in-vehicle network.

The memory 22, which is another example of a storage unit, includes, for example, volatile and nonvolatile semiconductor memories, and stores various algorithms and various types of data used in the driving support process executed by the processor 23 of the ECU 7. For example, the memory 22 stores parameters of the camera 3 such as the mounted position, the orientation, and the focal length. The memory 22 further stores various parameters for specifying a classifier for object detection used for detecting a predetermined feature or other objects, various parameters used for detecting portions of the driver's face from a head image and for determining the driver's sleepiness level, and other parameters. In addition, the memory 22 temporarily stores images of the surroundings of the vehicle 10, head images, positioning information, a high-precision map, and various types of data generated during the driving support process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the driving support process.

Figure 3:
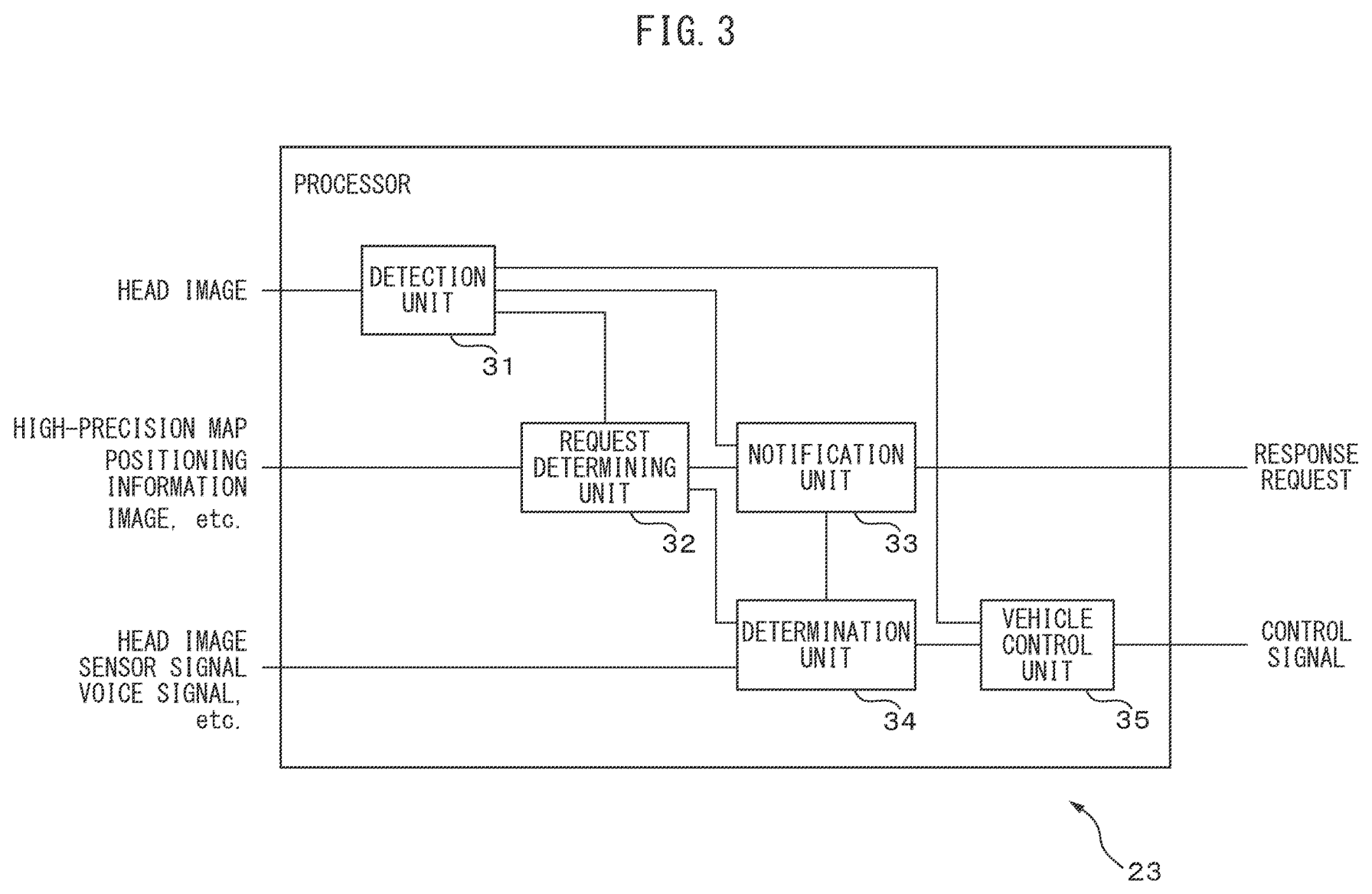

FIG. 3 is a functional block diagram of the processor 23, related to the driving support process. The processor 23 includes a detection unit 31, a request determining unit 32, a notification unit 33, a determination unit 34, and a vehicle control unit 35. These units included in the processor 23 are functional modules, for example, implemented by a computer program executed by the processor 23, or may be dedicated operating circuits provided in the processor 23.

The detection unit 31 detects a sign of the driver's sleepiness, based on a head image. For example, the detection unit 31 determines the driver's sleepiness level at predetermined intervals, based on a series of head images obtained in a most recent certain period. When the driver's sleepiness level is not lower than a predetermined level, the detection unit 31 determines that there is a sign of the driver's sleepiness. To achieve this, the detection unit 31 detects the driver's looking direction and the degrees of opening of the eyes and the mouth (hereafter referred to as the "eye opening level" and the "mouth opening level," respectively) of the driver from each of a series of head images obtained in the most recent certain period. The detection unit 31 determines the driver's sleepiness level, based on the detected looking direction, eye opening level, and mouth opening level.

To achieve this, the detection unit 31 detects a region representing the driver's face (hereafter a "face region") in each head image, for example, by inputting the head image into a classifier that has been trained to detect a driver's face from an image. As such a classifier, the detection unit 31 can use, for example, a deep neural network (DNN) having architecture of a convolutional neural network (CNN) type, e.g., Single Shot MultiBox Detector (SSD) or Faster R-CNN. Alternatively, the detection unit 31 can use a DNN having architecture of a self-attention network (SAN) type, such as Vision transformer. Alternatively, as such a classifier, the detection unit 31 may use a classifier based on another machine learning technique, such as an AdaBoost classifier. Such a classifier is trained in advance in accordance with a predetermined training technique, such as backpropagation, with a large number of training images representing a human face. The detection unit 31 detects the driver's eyes and mouth from the face region of each head image. To this end, the detection unit 31 applies, for example, an edge detection filter, such as a Sobel filter, to detect edge pixels in the face region. The detection unit 31 then detects lines of edge pixels extending in a substantially horizontal direction, and detects, for each of the left and right eyes, such two lines separated vertically in an area in the face region where the eye is supposed to lie, as the upper and lower eyelids of the eye. Similarly, the detection unit 31 detects a sub-region defined by such two lines separated vertically in an area in the face region where the mouth is supposed to lie, as the driver's mouth. The detection unit 31 may detect the upper and lower eyelids of the driver's left and right eyes from the head images in accordance with another technique to detect eyelids from an image. Similarly, the detection unit 31 may detect the driver's mouth from the head images in accordance with another technique to detect a mouth from an image. For example, the classifier may be trained in advance so as to detect the upper and lower eyelids and the mouth directly from a head image. In this case, the detection unit 31 can detect the upper and lower eyelids and the mouth by inputting a head image into the classifier.

For each head image, the detection unit 31 estimates the driver's eye opening level, based on the distances between the upper and lower eyelids of the left and right eyes. For example, the detection unit 31 determines the average of the distances between the upper and lower eyelids of the left and right eyes as the eye opening level. The detection unit 31 may estimate the eye opening level in accordance with another technique to calculate an eye opening level from upper and lower eyelids in an image. The detection unit 31 calculates the interval between maxima of the eye opening level from time-varying changes in the eye opening level in the series of head images as the duration of the driver's single blink. The detection unit 31 then counts the number of times of blinks in the most recent certain period, and calculates the average of intervals between blinks as the period of a blink. In addition, the detection unit 31 calculates the ratio of the vertical length of the mouth to the horizontal length thereof for each head image in the most recent certain period, and calculates the average of the ratios as the driver's mouth opening level. The detection unit 31 may calculate the driver's mouth opening level in accordance with another technique to calculate a mouth opening level from an area representing a mouth in an image.

The detection unit 31 further detects the driver's looking direction from each head image. For example, in at least one of the driver's left and right eyes represented in each head image, the detection unit 31 detects a corneal reflection image of the light source and the centroid of the pupil (hereafter simply the "pupillary centroid") from the region defined by the upper and lower eyelids (hereafter the "eye region"). A corneal reflection image of a light source is also referred to as a Purkinje image. Specifically, the detection unit 31 detects a Purkinje image, for example, by template matching of the eye region with templates of a Purkinje image. Similarly, the detection unit 31 detects the pupil by template matching of the eye region with templates of a pupil, and determines the centroid of the region representing the detected pupil as the pupillary centroid. The detection unit 31 may detect a Purkinje image and the pupillary centroid in accordance with another technique to detect them from an eye region. The detection unit 31 then calculates the distance between the Purkinje image and the pupillary centroid, and detects the driver's looking direction by referring to a table representing the relationship between this distance and a driver's looking direction. Such a table may be prestored in the memory 22. The detection unit 31 determines the amount of change in the looking direction for each pair of successive head images in the most recent certain period, and calculates the rate of change in the looking direction by dividing the average of the amounts of change by the interval of acquisition of the head images.

The detection unit 31 determines the driver's sleepiness level, based on at least one of the number of times and frequency of blinks, the mouth opening level, and the rate of change in the looking direction. When the sleepiness level is not lower than the predetermined level, the detection unit 31 determines that there is a sign of the driver's sleepiness. For example, the detection unit 31 determines that there is a sign of the driver's sleepiness, in the case where the number of times of blinks in the most recent certain period is greater than a predetermined number, the period of a blink is longer than a predetermined time threshold, the rate of change in the looking direction is not higher than a predetermined speed threshold, and the mouth opening level is higher than a predetermined opening level. When at least one of the number of times and frequency of blinks, the mouth opening level, and the rate of change in the looking direction in the most recent certain period does not satisfy the above-mentioned condition, the detection unit 31 determines that there is not a sign of the driver's sleepiness. Alternatively, the detection unit 31 may set conditions for detecting a sign of sleepiness regarding a combination of three or fewer of the number of times and frequency of blinks, the mouth opening level, and the rate of change in the looking direction. The detection unit 31 determines that there is a sign of the driver's sleepiness, when these detection conditions are satisfied, and determines that there is not a sign of the driver's sleepiness, when these detection conditions are not satisfied.

When it is determined that there is a sign of the driver's sleepiness, i.e., when a sign of the driver's sleepiness is detected, the detection unit 31 notifies the result of this detection to the request determining unit 32 and the vehicle control unit 35. When it is determined that there is not a sign of the driver's sleepiness, the detection unit 31 notifies the result of this determination to the notification unit 33 and the vehicle control unit 35.

The request determining unit 32 determines a response request to the driver, depending on environment around the vehicle 10 or a travel condition of the vehicle 10, when notified by the detection unit 31 that a sign of the driver's sleepiness is detected. The response request is a request to the driver for performing a predetermined response action.

When determining a response request based on environment around the vehicle 10, the request determining unit 32 detects a predetermined feature in an area around the vehicle 10 as one representing environment around the vehicle 10, and determines a response request related to information represented on the detected feature. As such a predetermined feature, the request determining unit 32 may detect, for example, a speed limit sign. In this case, the request determining unit 32 determines a request for a response depending on the speed limit indicated by the speed limit sign as the response request. More specifically, the request determining unit 32 can determine a question asking the speed limit indicated by the detected speed limit sign as a response request. Alternatively, the request determining unit 32 may determine a request for tapping the steering wheel as many times as the number of the speed limit represented on the detected speed limit sign divided by 10, as the response request. The request determining unit 32 may detect a traffic sign other than a speed limit sign as the predetermined feature, and determine a response request depending on information represented on the detected traffic sign. For example, when a guide sign with a place name is detected, the request determining unit 32 determines a question asking the place name as the response request.

As the predetermined feature, the request determining unit 32 may detect a predetermined road marking, such as a crosswalk or a stop line. In this case, the request determining unit 32 determines a request for saying a predetermined word or tapping the steering wheel every time such a road marking is detected, as the response request.

To detect a predetermined feature like that described above, the request determining unit 32 refers to the high-precision map and the current position of the vehicle 10 indicated by the latest positioning information obtained by the GPS receiver 2. The request determining unit 32 determines that a predetermined feature is detected, when the predetermined feature is represented on or around the road including the current position of the vehicle 10 within the driver's visible range (e.g., several meters to a dozen or so meters) of the current position of the vehicle 10 in the high-precision map.

Alternatively, the request determining unit 32 may determine that a predetermined feature is detected, when the predetermined feature can be detected from the latest image generated by the camera 3. In this case, the request determining unit 32 inputs the latest image into a classifier that has been trained to detect a predetermined feature, thereby detecting the predetermined feature. As such a classifier, the request determining unit 32 can use, for example, a DNN having architecture of a CNN type, such as SSD or Faster R-CNN, or a DNN having architecture of a SAN type, such as Vision transformer. Alternatively, as such a classifier, the request determining unit 32 may use a classifier based on another machine learning technique, such as a support vector machine. Such a classifier is trained in advance in accordance with a predetermined training technique, such as backpropagation, with a large number of training images representing a predetermined feature to be detected.

When determining a response request based on a travel condition of the vehicle 10, the request determining unit 32 can use a condition related to an action of the vehicle 10, such as acceleration or deceleration of the vehicle 10 or a turn of the vehicle 10, as such a travel condition. The request determining unit 32 detects an action of the vehicle 10, and determines a request for a response related to the detected action as the response request. For example, in the case where the vehicle 10 is accelerating or is going to start accelerating when a sign of sleepiness is detected, the request determining unit 32 may determine a request for tapping the top of the steering wheel or saying "speed up" as the response request. In the case where the vehicle 10 is decelerating or is going to start decelerating when a sign of sleepiness is detected, the request determining unit 32 may determine a request for tapping the bottom of the steering wheel or saying "slow down" as the response request. In the case where the vehicle 10 is making a lane change, a left turn, or a right turn, or is going to make one of them when a sign of sleepiness is detected, the request determining unit 32 may determine a request for tapping a specific portion of the steering wheel corresponding to the direction in which the vehicle 10 goes or saying the direction in which vehicle 10 goes, as the response request.

To identify the travel condition for determining a response request, the request determining unit 32 uses a sensor signal from a sensor for detecting an action of the vehicle 10 (not illustrated), such as an acceleration sensor or a steering angle sensor provided in the vehicle 10. When the sensor signal indicates an acceleration whose absolute value is not less than a predetermined threshold, the request determining unit 32 identifies the vehicle 10 being accelerated as the travel condition for determining a response request. Similarly, when the sensor signal indicates a deceleration whose absolute value is not less than a predetermined threshold, the request determining unit 32 identifies the vehicle 10 being decelerated as the travel condition for determining a response request. When the sensor signal indicates a steering angle whose absolute value is not less than a predetermined threshold, the request determining unit 32 identifies a turn of the vehicle 10 in the direction indicated by the sensor signal as the travel condition for determining a response request.

To identify the travel condition for determining a response request, the request determining unit 32 may refer to one of the current position of the vehicle 10 indicated by the latest positioning information obtained by the GPS receiver 2, the high-precision map, and a planned travel route that is set by a navigation device (not illustrated). For example, when there is an intersection at which a left or right turn will be made to go to a destination along a planned travel route within a predetermined distance of the current position of the vehicle 10, the request determining unit 32 identifies a turn of the vehicle 10 to the direction in which the vehicle will go at this intersection as the travel condition for determining a response request. When there is a point where the vehicle 10 will be required to stop, such as a tollgate or a railroad crossing, within a predetermined distance of the current position of the vehicle 10 in the travel direction of the vehicle 10, the request determining unit 32 identifies deceleration of the vehicle 10 as the travel condition for determining a response request.

When the ECU 7 is executing autonomous driving control of the vehicle 10, the request determining unit 32 may identify the travel condition for determining a response request, based on a task being executed in the autonomous driving control. For example, when the ECU 7 is executing control to pass a vehicle ahead, the request determining unit 32 identifies acceleration of the vehicle 10 or the travel direction of the vehicle 10 in a lane change for passing as the travel condition for determining a response request.

Further, the request determining unit 32 may identify the travel condition for determining a response request, based on traffic information received via a wireless communication terminal (not illustrated). For example, in the case where a road being traveled by the vehicle 10 is congested, and where a point of relief of the traffic congestion indicated by received traffic information is within a predetermined distance of the current position of the vehicle 10, the request determining unit 32 identifies acceleration of the vehicle 10 as the travel condition for determining a response request.

When a sign of the driver's sleepiness is detected, the request determining unit 32 may determine whether there is a predetermined feature usable for determining a response request in an area around the vehicle 10. When there is such a feature, the request determining unit 32 may determine a response request as described above, based on this feature. When there is not such a feature, the request determining unit 32 determines a response request, based on a travel condition of the vehicle 10. Alternatively, when a sign of the driver's sleepiness is detected, the request determining unit 32 may determine whether a travel condition usable for determining a response request is set. When such a travel condition is set, the request determining unit 32 may determine a response request as described above, based on the travel condition. When such a travel condition is not set, the request determining unit 32 determines a response request, based on a predetermined feature in an area around the vehicle 10. In the case where there is not a predetermined feature usable for determining a response request, and where no travel condition usable for determining a response request is set, the request determining unit 32 determines a preset standard response request (e.g., a question asking the current speed of the vehicle 10) as a response request to be notified.

The request determining unit 32 notifies the type of the determined response request to the notification unit 33 and the determination unit 34.

The notification unit 33 notifies the driver of a response request of the type determined by the request determining unit 32, via the user interface 6.

For example, when the response request is to tap a predetermined position of the steering wheel, the notification unit 33 causes a message requesting tapping the steering wheel and representing the position to be tapped (e.g., "Tap the top of the steering wheel") or an icon to appear on the display or the touch screen display included in the user interface 6. Similarly, when the response request is to tap the steering wheel a predetermined number of times, the notification unit 33 causes a message requesting tapping the steering wheel a predetermined number of times (e.g., "Tap the steering wheel eight times") or an icon to appear on the display or the touch screen display included in the user interface 6. When the response request is that the driver says a predetermined word, the notification unit 33 causes a message representing the details of the requested word (e.g., "Answer the speed limit shown on the speed limit sign you have just passed," "Say 'speed up,'" or "Say 'turn left'") or an icon to appear on the display or the touch screen display included in the user interface 6.

When the user interface 6 includes a speaker, the notification unit 33 may further cause the speaker to output a message like those described above as a voice signal.

When starting notification of a response request like those described above, the notification unit 33 notifies the determination unit 34 that notification of a response request is started. The notification unit 33 stops notification of a response request like those described above, when notified by the detection unit 31 of the result of determination that no sign of the driver's sleepiness is detected or notified by the determination unit 34 of the result of determination that the driver has made an appropriate response after the start of notification of the response request. Alternatively, the notification unit 33 may stop notification of a response request, when notified by the determination unit 34 that the driver has made a response requested in the response request for a certain period. Alternatively, regardless of the result of determination by the determination unit 34, the notification unit 33 may stop notification of a response request, only when notified by the detection unit 31 of the result of determination that no sign of the driver's sleepiness is detected.

Figures 4A, 4B:
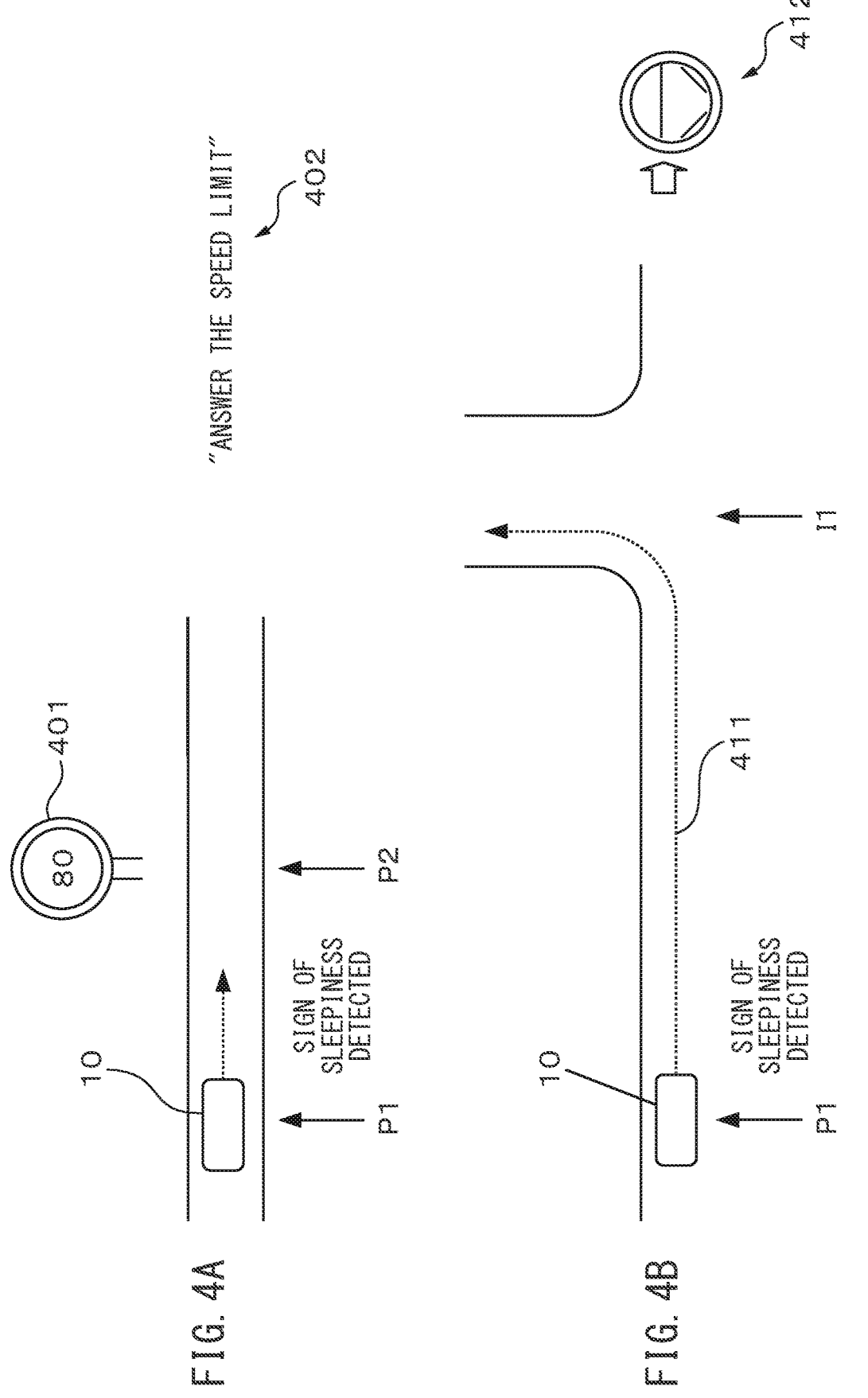
FIG. 4A illustrates an example of a response request.
FIG. 4B illustrates another example of a response request.

FIGS. 4A and 4B illustrate examples of the response request. In the example illustrated in FIG. 4A, a response request is determined based on environment around the vehicle 10. More specifically, in this example, when the vehicle 10 is at a point P1, a sign of the driver's sleepiness is detected and there is a speed limit sign 401 indicating 80 km/h at a point P2 ahead of the vehicle 10. Thus, a question asking the speed limit indicated by the speed limit sign 401 is determined as a response request, and notification of a message 402 "Answer the speed limit" is given via the user interface 6. As a response request, tapping the steering wheel eight times may be requested, as described above.

In the example illustrated in FIG. 4B, a response request is determined based on a travel condition of the vehicle 10. More specifically, in this example, when the vehicle 10 is at a point P1, a sign of the driver's sleepiness is detected and a planned travel route 411 of the vehicle 10 indicates that the vehicle 10 will turn left at an intersection 11. Thus, tapping the left side of the steering wheel is determined as a response request, and an icon 412 indicating tapping the left side of the steering wheel is displayed by the user interface 6. As a response request, saying "turn left" may be requested, as described above.

The determination unit 34 determines whether the driver has made a response requested in a notified response request, after notification of the response request. For example, when the notified response request is to tap a predetermined position of the steering wheel, the determination unit 34 determines whether the ECU 7 receives a detection signal from a touch sensor provided in the predetermined position within a predetermined period of notification of the response request. When the ECU 7 receives a detection signal within the predetermined period from the touch sensor provided in the predetermined position of the steering wheel, the determination unit 34 determines that the driver has made a response requested in the response request. When the ECU 7 does not receive a detection signal within the predetermined period from the touch sensor provided in the predetermined position of the steering wheel, the determination unit 34 determines that the driver has not made a response requested in the response request. Unless a detection signal is received from the touch sensor provided in the predetermined position, the determination unit 34 determines that the driver has not made a response requested in the response request, even if the ECU 7 receives a detection signal within the predetermined period from a touch sensor provided in a position different from the predetermined position specified in the response request.

Similarly, when the notified response request is to tap the steering wheel a predetermined number of times, the determination unit 34 counts detection signals received by the ECU 7 from touch sensors provided in the steering wheel within a predetermined period of notification of the response request. When the number of detection signals received within the predetermined period matches the number of times specified in the response request, the determination unit 34 determines that the driver has made a response requested in the response request. When the number of detection signals received within the predetermined period differs from the number of times specified in the response request or when the ECU 7 does not receive a detection signal within the predetermined period, the determination unit 34 determines that the driver has not made a response requested in the response request. When the error between the number of detection signals received within the predetermined period and the number of times specified in the response request is not greater than a predetermined number (e.g., 1 or 2), the determination unit 34 may determine that the driver has made a response requested in the response request.

The determination unit 34 may detect the driver tapping the steering wheel and the tapped position on the steering wheel, based on head images. In this case, the determination unit 34 inputs a series of head images obtained within the predetermined period after notification of a response request into a classifier that has been trained to detect a driver's hand, thereby detecting the position of the driver's hand from each head image. As such a classifier, the determination unit 34 can use a classifier having a configuration similar to that of the classifier used for detecting a face region. The determination unit 34 compares the position of the driver's hand detected from each head image with the position of the steering wheel in the head image. The position of the steering wheel in head images may be prestored in the memory 22. Alternatively, the classifier may be trained in advance so as to detect the steering wheel, together with the driver's hand. When the hand is positioned to contact a position on the steering wheel in one of the head images, the determination unit 34 determines that the driver tapped this position on the steering wheel at the time of generation of this head image.

When the notified response request is that the driver says a predetermined word, the determination unit 34 applies a predetermined voice recognition technique to a voice signal received by the ECU 7 from the microphone within a predetermined period of notification of the response request, thereby determining whether the driver has said the predetermined word. When the driver has said the predetermined word, the determination unit 34 determines that the driver has made a response requested in the response request. When the driver has not said the predetermined word, the determination unit 34 determines that the driver has not made a response requested in the response request. As the predetermined voice recognition technique, the determination unit 34 can use, for example, a GMM-HMM technique, in which a Gaussian mixture model (GMM) and a hidden Markov model (HMM) are used, or a DNN-HMM technique, in which a "deep neural network (DNN)" is used instead of a Gaussian mixture model. In addition, the determination unit 34 calculates the degree of matching between a character string representing the word said by the driver identified by applying the predetermined voice recognition technique to the voice signal and a character string corresponding to the predetermined word requested in the notified response request, e.g., the inverse of a Levenshtein distance or a Jaro-Winkler distance. When the degree of matching calculated for a sub-period of the voice signal obtained within the predetermined period is not less than a predetermined matching determination value, the determination unit 34 determines that the driver has said the predetermined word. When the degree of matching calculated for any sub-period of the voice signal obtained within the predetermined period is less than the predetermined matching determination value, the determination unit 34 determines that the driver has not said the predetermined word.

When it is determined that the driver has made a response requested in the response request, the determination unit 34 notifies the result of this determination to the notification unit 33. When it is determined that the driver has not made a response requested in the response request even after the predetermined period from notification of the response request, the determination unit 34 notifies the result of this determination to the vehicle control unit 35.

The vehicle control unit 35 controls the vehicle 10 according to a level of driving control applied to the vehicle 10, until the vehicle control unit 35 is notified by the detection unit 31 that a sign of the driver's sleepiness is detected and receives the result of determination that the driver has not made a response requested in the response request from the determination unit 34. When the level of driving control applied to the vehicle 10 does not require the driver to operate the vehicle 10, the vehicle control unit 35 controls the vehicle 10 so as to travel along a host vehicle lane on which the vehicle 10 is traveling. To achieve this, the vehicle control unit 35 detects a lane line that divides the host vehicle lane and an adjacent lane as well as moving objects, such as other traveling vehicles around the vehicle 10, from an image generated by the camera 3. The vehicle control unit 35 compares the detected lane line with the high-precision map to estimate the position and orientation of the vehicle 10. Based on the result of estimation of the position and orientation of the vehicle 10 and the results of detection of individual moving objects around the vehicle 10, the vehicle control unit 35 controls the vehicle 10 so that the vehicle 10 does not collide with any of the moving objects and travels along the host vehicle lane.

The vehicle control unit 35 controls the vehicle 10 so that the vehicle 10 makes an emergency stop, when the vehicle control unit 35 is notified by the detection unit 31 that a sign of the driver's sleepiness is detected and receives the result of determination that the driver has not made a response requested in the response request from the determination unit 34. Alternatively, when a sign of the driver's sleepiness is still being detected even after a predetermined period from notification by the detection unit 31 that a sign of the driver's sleepiness is detected, the vehicle control unit 35 may also control the vehicle 10 so that the vehicle 10 makes an emergency stop, regardless of the result of determination by the determination unit 34. To this end, the vehicle control unit 35 sets the degree of accelerator opening or the amount of braking so as to decelerate the vehicle 10 at a predetermined deceleration. The vehicle control unit 35 determines the amount of fuel injection according to the set degree of accelerator opening, and outputs a control signal depending on the amount of fuel injection to a fuel injector of an engine of the vehicle 10. Alternatively, the vehicle control unit 35 determines electric power to be supplied to a motor according to the set degree of accelerator opening, and controls a driving circuit of the motor so that the determined electric power is supplied to the motor. In addition, the vehicle control unit 35 outputs a control signal depending on the set amount of braking to the brake of the vehicle 10. The vehicle control unit 35 may stop the vehicle 10 after moving the vehicle 10 to a road shoulder, based on the result of estimation of the position and orientation of the vehicle 10, the results of detection of individual moving objects around the vehicle 10, and the high-precision map.

Figure 5:
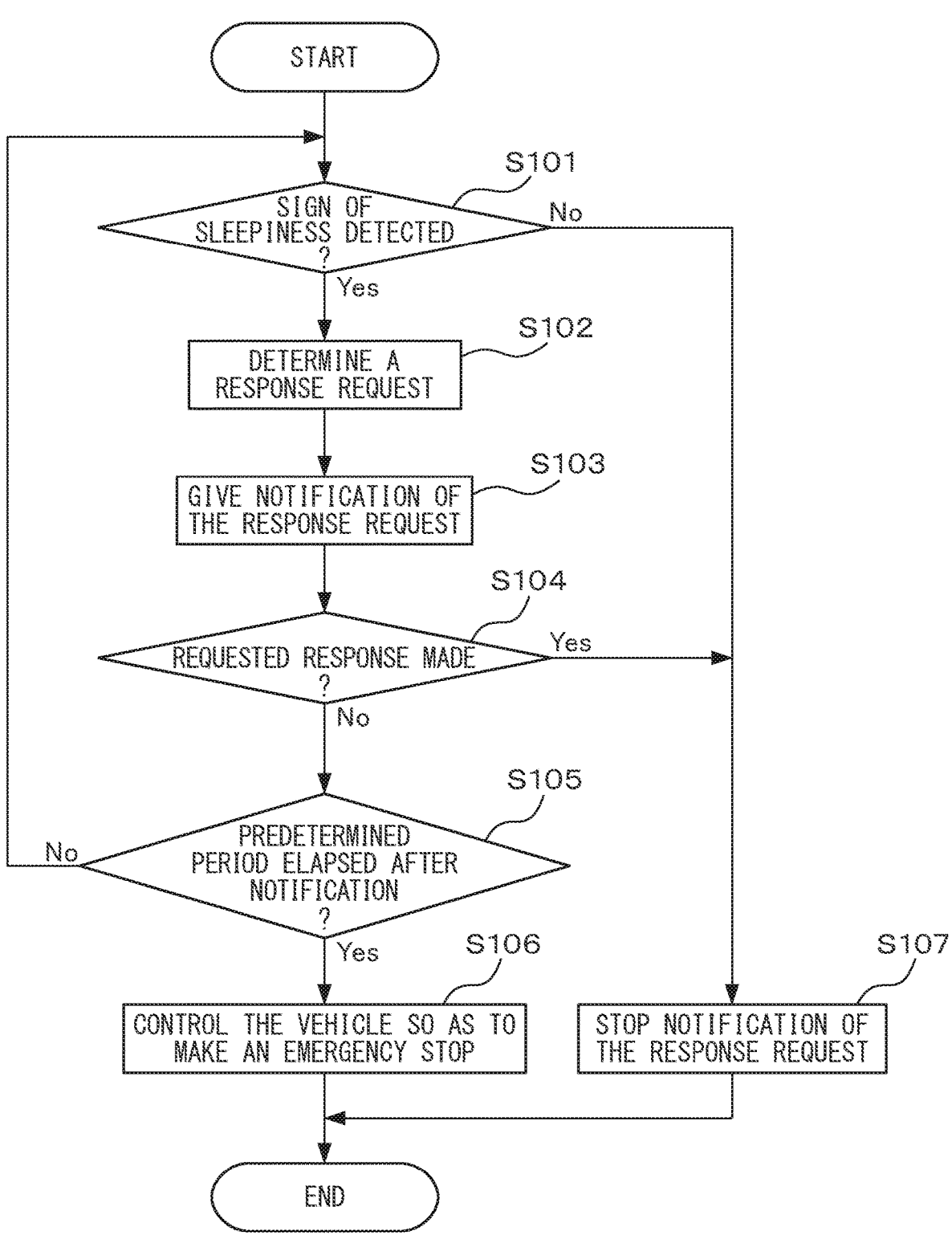
FIG. 5 is an operation flowchart of the driving support process.

FIG. 5 is an operation flowchart of the driving support process executed by the processor 23. The processor 23 executes the driving support process at predetermined intervals in accordance with the operation flowchart described below.

The detection unit 31 of the processor 23 determines whether a sign of the driver's sleepiness is detected, based on a driver image (step S101). When a sign of sleepiness is detected (Yes in step S101), the request determining unit 32 of the processor 23 determines a response request, based on environment around the vehicle 10 or a travel condition of the vehicle 10 (step S102). The notification unit 33 of the processor 23 notifies the driver of the determined response request via the user interface 6 (step S103).

After notification of the response request, the determination unit 34 of the processor 23 determines whether the driver has made a requested response (step S104). When a requested response is not made (No in step S104), the determination unit 34 determines whether a predetermined period has elapsed since the notification of the response request (step S105). When the predetermined period has not elapsed (No in step S105), the processor 23 repeats the processing of step S101 and the subsequent steps. When the predetermined period has elapsed (Yes in step S105), the determination unit 34 determines that the driver has not made a requested response. The vehicle control unit 35 of the processor 23 then controls the vehicle 10 so that the vehicle 10 makes an emergency stop (step S106).

When a requested response is made in step S104 (Yes in step S104), the notification unit 33 stops notification of the response request (step S107).

When no sign of the driver's sleepiness is detected in step S101 (No in step S101), the notification unit 33 also stops notification of the response request (step S107). When notification of a response request is not given, the processing of step S107 is omitted.

After step S106 or S107, the processor 23 terminates the driving support process.

As has been described above, when a sign of a driver's sleepiness is detected, the driving support device determines a response request to the driver, depending on environment around a vehicle or a travel condition of the vehicle, and notifies the driver of the determined response request via an interface provided in the vehicle. The driving support device causes the driver to make a response depending on the notified response request thereby encouraging the driver to remain awake. In this way, the driving support device can change details of a response request for the case where a sign of the driver's sleepiness is detected, and thus prevent the driver from easily getting used to notified response requests. The driving support device can therefore support the driver in remaining awake appropriately when the driver gives a sign of sleepiness.

According to a modified example, the request determining unit 32 may request the driver's action other than tapping the steering wheel, as a response request. For example, when determining a response request based on environment around the vehicle 10, the request determining unit 32 may request a gaze on a feature used for determining a response request, e.g., a speed limit sign, as the response request. In this case, the notification unit 33 causes a message requesting a gaze on a feature used for determining a response request to appear on the display or the touch screen included in the user interface 6. Alternatively, the notification unit 33 causes the speaker included in the user interface 6 to output a voice requesting a gaze on a feature used for determining a response request. The determination unit 34 determines that the driver is gazing the feature, when the difference between the driver's looking direction detected based on head images and the direction from the vehicle 10 to the feature is not greater than a predetermined angular difference. When the feature is detected based on the high-precision map and the current position of the vehicle 10 based on positioning information, the determination unit 34 can identify the direction from the vehicle 10 to the feature, based on the position of the feature represented in the high-precision map and the current position and the travel direction of the vehicle 10. When the feature is detected from an image generated by the camera 3, the determination unit 34 can identify the direction from the vehicle 10 to the feature, based on the centroid position of a region representing the feature in the image and the orientation and the focal length of the camera 3.

According to another modified example, the request determining unit 32 may change the type of response request, depending on the level of autonomous driving control applied to the vehicle 10 when a sign of the driver's sleepiness is detected. For example, in the case where the level of autonomous driving control applied to the vehicle 10 when a sign of the driver's sleepiness is detected is level 3 or 2 defined by SAE, the request determining unit 32 requests a response of the driver's utterance or action, as a response request. In the following, level m of autonomous driving control defined by SAE (m=0 to 5) will be referred to simply as "level m." In the case where the level of autonomous driving control applied to the vehicle 10 when a sign of the driver's sleepiness is detected is level 1 or lower, the request determining unit 32 requests a response of tapping the steering wheel, as a response request. For example, assume that a response request is determined based on a speed limit sign in an area around the vehicle 10, as in the embodiment. In the case where the level of autonomous driving control applied to the vehicle 10 when a sign of the driver's sleepiness is detected is level 3 or 2, the request determining unit 32 determines a question asking the speed limit indicated by the speed limit sign or a request for a gaze on the speed limit sign, as the response request. In the case where the level of autonomous driving control applied to the vehicle 10 when a sign of the driver's sleepiness is detected is level 1 or lower, the request determining unit 32 determines a request for tapping the steering wheel as many times as the number of the speed limit represented on the detected speed limit sign divided by 10, as the response request.

In the case where the level of autonomous driving control applied to the vehicle 10 when a sign of the driver's sleepiness is detected is level 2 or lower, the request determining unit 32 may determine a request for tapping the steering wheel as many times as the number of the speed limit represented on the detected speed limit sign divided by 10, as the response request.

In this way, the request determining unit 32 changes the type of response request, depending on the level of autonomous driving control applied to the vehicle 10 when a sign of the driver's sleepiness is detected, and can thereby support the driver in remaining awake appropriately while reducing the driver's irksomeness.

According to still another modified example, the request determining unit 32 may determine the response request so that a more complicated response is requested of the driver as the driver's sleepiness level detected by the detection unit 31 is higher. In this case, a criterion is preset for each of sleepiness levels of the driver. For each sleepiness level, the detection unit 31 determines whether the criterion at the sleepiness level is satisfied, based on at least one of the period and frequency of blinks, the mouth opening level, and the rate of change in the looking direction. The detection unit 31 then determines the highest of sleepiness levels at which their criteria are satisfied, as the driver's sleepiness level.

For example, assume that the driver is determined to be at a sleepiness level where there is a sign of sleepiness, in the case where a response request is determined based on a speed limit sign in an area around the vehicle 10, as in the embodiment. In this case, the request determining unit 32 determines, as the response request, a question asking the speed limit indicated by the speed limit sign or a request for tapping the steering wheel as many times as the number of the speed limit divided by 10, as in the embodiment. When the driver is at a higher sleepiness level, e.g., a level that is considered a scarcely waking state, the request determining unit 32 can determine a question asking the difference between the speed limit indicated by the speed limit sign and the vehicle speed indicated by a speed meter of the vehicle 10, as the response request. Alternatively, when the driver is at a sleepiness level considered a scarcely waking state, the request determining unit 32 may determine a question asking the sum of numerals on the license plate of a vehicle traveling ahead of the vehicle 10, as a response request. In this case, the determination unit 34 detects the license plate of a vehicle ahead from an image generated by the camera 3, identifies individual numerals on the detected license plate, and calculates the sum of these numerals. To this end, the determination unit 34 identifies these numerals by inputting the image into a classifier that has been trained to identify a license plate represented in an image and numerals on the license plate. According to this modified example, the request determining unit 32 causes a stronger stimulus to be given to the driver as the driver's sleepiness level is higher, enabling enhancing the effect of waking.

The request determining unit 32 may change the type of notified response request, in the case where a sign of sleepiness is still being detected by the detection unit 31 even if it is determined by the determination unit 34 that the driver has made a requested response after notification of the response request. For example, the request determining unit 32 may change the notified response request so that a more complicated response is requested of the driver as a sign of sleepiness is being detected longer by the detection unit 31. In this way, the driver is more appropriately supported in remaining awake.

According to still another modified example, the determination unit 34 may execute a process to impose a penalty on the driver, when it is determined that the driver has made a response different from the requested response. For example, in the case where level 3 autonomous driving control is applied to the vehicle 10, and where the driver has made a response different from the requested response, the determination unit 34 may reduce the level of autonomous driving control applied to the vehicle 10 to level 2. There-after, when a sign of the driver's sleepiness is detected, the notification unit 33 may notify the driver of a warning that a sign of sleepiness is detected, via the user interface 6, instead of a response request. Even in this case, the ECU 7 may execute level 3 autonomous driving control, when application of level 3 becomes possible after the elapse of a certain period. The ECU 7 may make a response request to the driver again when a sign of the driver's sleepiness is detected. Similarly, in the case where level 2 autonomous driving control is applied to the vehicle 10, and where the driver has made a response different from the requested response, the determination unit 34 may reduce the level of autonomous driving control applied to the vehicle 10 to level 1 or 0. In other words, the determination unit 34 may transfer control of the vehicle 10 to the driver. Thereafter, when a sign of the driver's sleepiness is detected, the notification unit 33 may notify the driver of a warning that a sign of sleepiness is detected, via the user interface 6, instead of a response request. Even in this case, the ECU 7 may execute level 2 autonomous driving control, when application of level 2 becomes possible after the elapse of a certain period. The ECU 7 may make a response request to the driver again when a sign of the driver's sleepiness is detected. In addi-tion, in the case where the level of autonomous driving control applied to the vehicle 10 is level 1 or lower, and where the driver has made a response different from the requested response, the determination unit 34 may stop application of autonomous driving control thereafter until the ignition switch of the vehicle 10 is turned off. Thereafter, when a sign of the driver's sleepiness is detected, the notification unit 33 may notify the driver of a warning that a sign of sleepiness is detected, via the user interface 6, instead of a response request. In the case where the ignition switch is once turned off and then turned on again, the ECU 7 may make a response request to the driver again when a sign of the driver's sleepiness is detected. By imposing such a penalty on the driver, the ECU 7 can increase the possi-bility that the driver will make an appropriate response at the next response request.

For example, when the response request is a request for saying a predetermined word, the determination unit 34 determines that the driver has made a response different from the requested response, in the case where such utter-ance by the driver is not detected, and where saying a word different from the predetermined word or tapping the steer-ing wheel is detected instead. When the response request is a request for a predetermined action, the determination unit 34 may determine that the driver has made a response different from the requested response, in the case where such an action by the driver is not detected, and where an action different from the predetermined action or the driver's utterance is detected instead.

When the driver's response is not detected in the prede-termined period after a response request to the driver, whether the driver does not respond because of sleepiness or irksomeness cannot be determined in some cases. Thus, according to yet another modified example, the determina-tion unit 34 may execute a process to give a predetermined reward to the driver every time the driver's appropriate response is detected after notification of a response request. The predetermined reward may be, for example, an incen-tive that can be spent on a certain service. In this way, the ECU 7 can increase the possibility that the driver will make an appropriate response at a response request.

As described above, those skilled in the art may make various modifications according to embodiments within the scope of the present invention.

What is claimed is:

1. A driving support device comprising:
a processor configured to:
detect a sign of sleepiness of a driver of a vehicle, based on a driver image representing the driver's head gen-erated by a driver monitoring camera configured to take a picture of the driver's head,
detect a predetermined feature in an area around the vehicle as one representing an environment around the vehicle,
determine a response request to the driver related to information represented on the detected predetermined feature as the response request, when a sign of the driver's sleepiness is detected,
notify the driver of the response request via a user interface provided in the vehicle;
determine whether the driver has made a response requested in the response request after notification of the response request, and
control the vehicle so as to stop the vehicle when the driver has not made the response even after a prede-termined period from notification of the response request.

2. The driving support device according to claim 1, wherein when a sign of the driver's sleepiness is detected, the processor detects an action of the vehicle as the travel condition and determines a request for a response related to the detected action of the vehicle as the response request.

3. The driving support device according to claim 1, wherein the processor determines the response request, depending on the level of autonomous driving control applied to the vehicle.

4. The driving support device according to claim 1, wherein the processor determines the level of the driver's sleepiness, and
the processor determines the response request so that a more complicated response is requested as the level of the driver's sleepiness is higher.

5. A method for supporting driving, comprising:
detecting a sign of sleepiness of a driver of a vehicle, based on a driver image representing the driver's head generated by a driver monitoring camera configured to take a picture of the driver's head;
detecting a predetermined feature in an area around the vehicle as one representing an environment around the vehicle;
determining a response request to the driver related to information represented on the detected predetermined feature as the response request, when a sign of the driver's sleepiness is detected;
notifying the driver of the response request via a user interface provided in the vehicle;
determining whether the driver has made a response requested in the response request after notification of the response request, and
controlling the vehicle so as to stop the vehicle when the driver has not made the response even after a prede-termined period from notification of the response request.

6. A non-transitory recording medium that stores a com-puter program for supporting driving, the computer program causing a processor mounted on a vehicle to execute a process comprising:

detecting a sign of sleepiness of a driver of the vehicle, based on a driver image representing the driver's head generated by a driver monitoring camera configured to take a picture of the driver's head;

detecting a predetermined feature in an area around the vehicle as one representing an environment around the vehicle;

determining a response request to the driver related to information represented on the detected predetermined feature as the response request, when a sign of the driver's sleepiness is detected;

notifying the driver of the response request via a user interface provided in the vehicle;

determining whether the driver has made a response requested in the response request after notification of the response request, and controlling the vehicle so as to stop the vehicle when the driver has not made the response even after a predetermined period from notification of the response request.

\* \* \* \* \*